Sept. 22, 1970   W. S. MONTALTO   3,529,850
SAFETY LEG SUPPORT FOR VEHICLES
Filed March 6, 1969

INVENTOR:
WILLIAM S. MONTALTO
BY
Elliott & Pastoriza,
ATTORNEYS

United States Patent Office
3,529,850
Patented Sept. 22, 1970

3,529,850
SAFETY LEG SUPPORT FOR VEHICLES
William S. Montalto, 11746 Exposition Blvd.,
Los Angeles, Calif. 90064
Filed Mar. 6, 1969, Ser. No. 804,809
Int. Cl. B60s 9/02
U.S. Cl. 280—150.5                    5 Claims

ABSTRACT OF THE DISCLOSURE

An elongated rigid bar is coupled to an integral block member adapted to be secured to the under frame of a vehicle adjacent to a wheel. The integral block includes horizontal and vertical channels intercepting each other to define an inverted L shaped channel structure. The arrangement is such that the bar may be stored in the horizontal channel when not in use. When used, the bar is received in the vertical channel after the vehicle has been jacked up to thereby provide an auxiliary safety support leg for the vehicle.

This invention relates to support devices and more particularly, to a safety leg support for vehicles to assure that a vehicle will remain in a raised, jacked position when working on the vehicle.

BACKGROUND OF THE INVENTION

Conventional vehicles such as automobiles, are normally provided with a bumper jack to enable a driver to jack up a portion of the car and change a tire, if necessary or perform other operations under the car. While such bumper jacks are relatively easy to use, in certain respects they are unstable and many accidents have occured as a consequence of the car rocking off from the bumper jack or slipping of the jack itself from the bumper.

To avoid such accidents and still maintain simplicity in jacking up a car, several different types of built-in jacks have been proposed. These jacks constitute a permanent part of the underside of the vehicle and once the vehicle has been jacked up, a relatively stable support is provided. However, there is still the possibility of the jack itself slipping due to worn gear teeth, or, if of the pneumatic type, collapsing as a consequence of air leaks. Moreover, such built-in jacks are relatively expensive to manufacture and install on a vehicle as compared to the conventional bumper jacks. As a consequence, there is still not readily available any type of inexpensive, safe, and convenient means for properly supporting a car once it has been jacked up.

BRIEF DESCRIPTION OF THE PRESENT INVENTION

With the foregoing in mind, it is a primary object of the present invention to provide a safety leg support for vehicles adapted to constitute a permanent part of the underside portion of the vehicle or to be readily secured thereto and operable in such a manner as to provide an auxiliary safety support for the vehicle once the same has been jacked up, all to the end that accidents as a consequence of slippage of the conventional types of jacks are avoided.

More particularly, the invention contemplates the provision of a single elongated rigid bar cooperating with a mounting means on an underside frame portion of the vehicle adjacent to one of the vehicle wheels. The arrangement is such that the bar may be vertically positioned with its upper end in the mounting and its lower end engaging the ground after the car has been jacked up to thereby define a safety leg to support the car should the jack slip.

In the preferred embodiment, the mounting means takes the form of an integral metallic block provided with horizontal and vertical channels intercepting each other to define an inverted L shaped channel structure in one side of the block. The elongated bar in turn includes a shaft extending at right angles from one end. This shaft is receivable in a bore horizontally extending at right angles to the channel structure from the point of interception of the channels to pass out the side of the block oposite the side including the channels. The shaft of the bar is receivable in this bore so that the bar may be swung from a horizontal position to a vertical position.

A biasing structure is provided to urge the bar towards the face of the block including the channels. With this arrangement, the bar may be received in the horizontal channel to extend horizontally beneath the car in an out of the way position when not in use. When it is desired to use the bar, the car is jacked up and the bar simply pulled forwardly, swung downwardly, and released so that the biasing means snaps the bar back into the vertical channel and provides a very stable and reliable structure.

The cross-section dimensioning of the channels and bar is preferably of a square configuration so that maximum stability is provided when the bar is in its vertical position against rocking movement of the vehicle fore and aft or from side to side.

BRIEF DESCRIPTION OF THE DRAWINGS

A better understanding of the preferred embodiment of the invention will be had by now referring to the accompanying drawings, in which.

DETAILED DESCRIPTION OF THE PREFERRED EMBODIMENT

Figure 1:
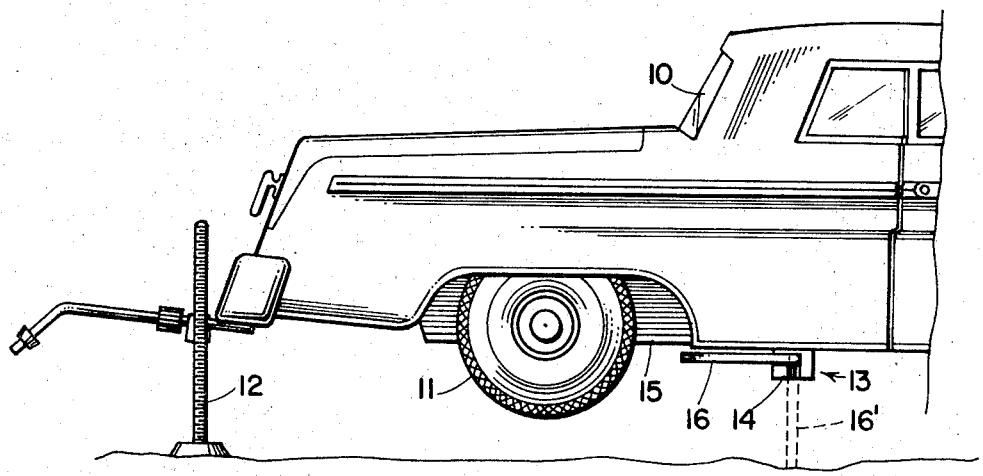
FIG. 1 is a fragmentary elevational view of the rear portion of a vehicle illustrating the manner in which the safety leg support of this invention operates.

Referring to FIG. 1 there is shown the rear portion of a vehicle 10 which, for illustrative purposes, is assumed to have a flat tire 11. As shown, the rear of the vehicle has been jacked up by a conventional bumper jack 12.

In accord with the present invention, a safety leg support for the vehicle is secured to the under side of the vehicle as indicated generally by the numeral 13. This support structure includes a mounting means 14 which may be bolted or preferably welded directly to an under frame portion 15 of the vehicle adjacent to the wheel. An elongated rigid bar 16 has one end coupled to the mounting means 14 in such a manner that the same may be swung from its solid line horizontal position as shown to a dotted vertical line position as indicated at 16' thereby providing an auxiliary safety leg to hold the vehicle in its raised or jacked position should the bumper jack 12 slip.

Figure 2:
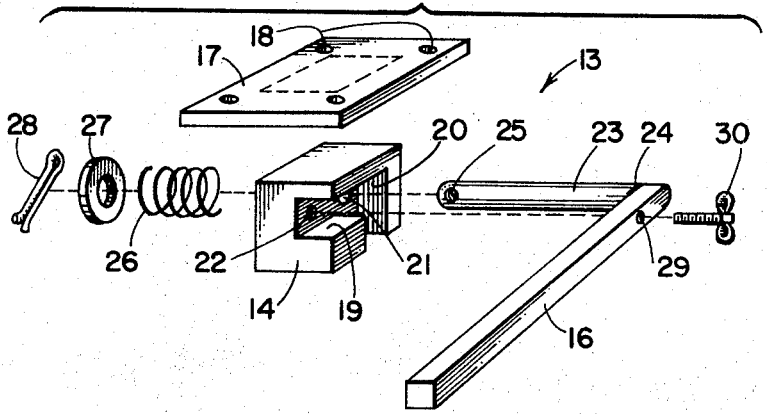
FIG. 2 is an exploded perspective view illustrating the various components making up the safety leg support in accord with the preferred embodiment.

Referring to FIG. 2, details of the safety leg support 13 are illustrated. As shown, the mounting means is in the form of an integral block 14 and may include a fastening plate 17, shown exploded above the top surface of the block. Normally, this top surface of the block would be welded to the under side of the plate 17 and by means of suitable screw holds 18, the plate may be secured to the under frame portion of the vehicle as described in FIG. 1. Alternatively, and preferably, the plate 17 or even the top surface of the block 14 itself would be directly welded to the under frame portion of the vehicle at the time of manufacture of the vehicle.

The integral block 14 includes a horizontal channel 19 in one side terminating at one end in the block as shown. A second vertical channel 20 is provided intercepting the one end of the horizontal channel 19 to define generally an inverted L shaped channel structure in the one side of the block. The block 14 also includes a journalling bore 21 horizontally extending from the common plane of interception of the horizontal and vertical channels through the block to open out of the side of the block opposite the side including the channel structure. The block also includes a small threaded bore 22 formed in the floor of the horizontal channel 19, the purpose for which will become clearer as the description proceeds.

The support leg in the form of the bar 16 itself includes at one end a shaft 23 extending at right angles and rigidly secured as at 24. The free end of the shaft 23 includes a small opening 25.

The shaft 23 is arranged to be received in the journalling bore 21 in the block 14. Thereafter, a compression spring 26 is positioned about the extending portion of the shaft 23 and a washer 27 placed about the end portion of the shaft. Finally, a cotter pin 28 is passed through the opening 25 to hold the washer member 27 to the end of the shaft with the compression spring 26 sandwiched between the washer and side of the block. This arrangement biases the bar 16 towards the one face of the block including the channel structure. The various components are completed by provision of a small opening 29 in the bar 16 for receiving a wing screw 30. This wing screw is arranged to be threadedly received in the small opening 22 in the floor of the horizontal channel 19.

Figure 3:
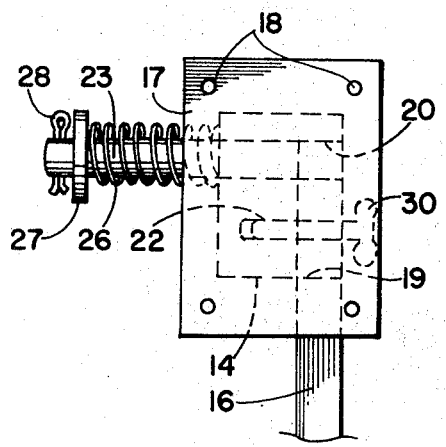
FIG. 3 is a fragmentary plan view of the various components of FIG. 2 in assembled relationship.

The foregoing described components in assembled relationship will appear as shown in FIG. 3 wherein the bar 16 is nested in the horizontal channel 19 with the wing screw 30 threaded into the opening 22. It will be noted that the compression spring 26 is confined between the side of the block 14 and the washer 27.

Figure 4:
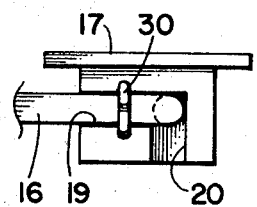
FIG. 4 is a fragmentary side elevational view showing the safety leg in its inoperative or stored position; and, FIG. 5 is a view similar to FIG. 4 but showing the safety leg support in its operating position.

FIG. 4 illustrates in side elevation the various components in the same position as shown in FIG. 3.

Figure 5:
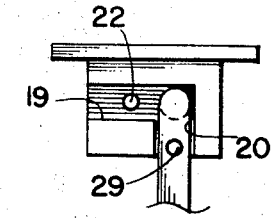

FIG. 5 illustrates the bar 16 moved from its nested position in the horizontal channel to its vertical position in the vertical channel 20.

OPERATION

The operation of the safety leg support will be evident from the foregoing description.

When a person wishes to change a tire or otherwise work on the under side of his car, it is a very simple matter for him to jack up the car with the conventional bumper jack 12 as illustrated in FIG. 1. Thereafter, the wing screw 30 is manually unthreaded and the rigid bar 16 grasped by both hands and pulled outwardly from the horizontal channel 19 against the compression force exerted by the spring 26. The operator will then swing the bar 16 downwardly to a vertical position whence it will snap into the vertical channel 20 as a consequence of the action of the compression spring 26. This latter position is illustrated in FIG. 5.

Should the bumper jack slip it will be evident that the auxiliary leg in the form of the bar 16 will now provide adequate support for the vehicle even should the vehicle rock sidewise. In this respect, the preferred embodiment of the invention contemplates making the support bar 16 of square cross-section and the horizontal and vertical channels also of square cross-section of similar dimensions. By so fabricating the structure in this manner there is provided large surface engagement between the sides of the bar 16 and the sidewalls of the vertical channel 20 when the bar is in the position illustrated in FIG. 5. This large surface engagement area assures stability against rocking movement of the car in a fore and aft direction. In addition, stability is provided, as noted, against sidewise movement of the car as a consequence of the side of the bar 16 engaging the flat floor surface of the vertical channel 20 and the fact that the rigidly extending shaft 23 is secured against lateral movement within the journalling bore 21. The strength of the compression spring is such as to assure that the bar 16 will be held within the vertical channel when in its operative position.

After properly positioning the bar as described, the user may, if he desires, let down on the bumper jack 12 slightly to cause the lower end of the bar to firmly engage the ground and thus provide a stable support.

When the operator has finished his work under the car, the car is again raised slightly by the bumper jack and the bar 16 then pulled forwardly to release it from the vertical channel 20. The bar may then be swung about its journalling shaft until it is aligned with the horizontal channel 19. The compression spring 26 will then cause the bar to snap into the horizontal channel. Thereafter the wing screw 30 may then be inserted to lock the bar in position and prevent its rattling. The vehicle may then be lowered by the conventional bumper jack and the operator may proceed on his way.

It is contemplated that four safety leg support structures such as described will be provided for each vehicle, these devices preferably being mounted adjacent the respective four wheels. In this manner, should any one of the tires need changing, the adjacent auxiliary safety leg support would be utilized in conjunction therewith. In addition, if it is desired to raise the entire vehicle, the four corners may be respectively raised by the bumper jack and the legs respectively positioned thereby raising the entire vehicle from the ground at a sufficient distance to permit a person to work underneath the same. Alternatively, the four legs may be used during storing of the car over an extended period of time to take the weight off of the tires.

From the foregoing description, it will be evident that the present invention has provided a rugged and simple as well as inexpensive auxiliary safety leg for vehicles wherein various desirable features as described heretofore are fully realized.

What is claimed is:

1. A safety leg support for vehicles, comprising, in combination:
    (a) an integral block adapted to be secured to the underside of the vehicles having a horizontal channel formed in one side terminating at one end in said block and a vertical channel of like cross-section to said horizontal channel formed in said one side and intercepting said horizontal channel at its said one end to define an inverted L shaped channel structure in said one side, said block additionally including a journalling bore horizontally extending at right angles from the plane of the common area of interception of said horizontal channel and said vertical channel, through said block to open out on the side of said block opposite said one side; and
    (b) an elongated bar of cross-section corresponding substantially to that of said vertical channel, said bar having a shaft extending from one end at a right angle, said shaft being slidably received in said journalling bore; and
    (c) means for urging said shaft toward said opposite side, whereby said bar may be positioned in said horizontal channel with said shaft in said journalling bore, and said bar pulled out of said horizontal channel and swung downwardly and pushed into said vertical channel after said vehicle has been jacked up to thereby provide an auxiliary safety support leg for said vehicle.

2. The subject matter of claim 1, in which said block includes a top mounting plate for permanent securement of said block to an under frame portion of said vehicle.

3. The subject matter of claim 1, in which the portion of said shaft extending from said side of said block opposite said one side terminates in a washer; and a compression spring surrounding said shaft between said washer and said side to bias said shaft and thus said bar into one or the other of the channels depending upon whether said bar is in a horizontal or vertical position.

4. The subject matter of claim 1, including a threaded wing screw, said bar having an opening for receiving said screw and said block having a threaded bore in the floor of said horizontal channel for threadedly receiving said screw whereby said bar may be tightly secured in said horizontal channel and thereby prevented from rattling.

5. The subject matter of claim 4, in which said horizontal channel and said vertical channel are of square cross-section and said bar is of square cross-section to thereby provide an increased stability for said bar when positioned in said vertical channel against rocking movement of said vehicle over that realizable if the cross-sectional dimensions of said bar were different from the cross-sectional dimensions of the channels.

References Cited

UNITED STATES PATENTS

| | | | |
|---|---|---|---|
| 3,146,002 | 8/1964 | Faber | 280—150.5 |
| 3,332,661 | 7/1967 | Hand | 254—86 |

LEO FRIAGLIA, Primary Examiner

R. R. SONG, Assistant Examiner

U.S. Cl. X.R.

248—352; 287—14